(12) United States Patent
Hwang et al.

(10) Patent No.: US 12,282,387 B2
(45) Date of Patent: Apr. 22, 2025

(54) MEMORY MANAGEMENT METHOD FOR SECURITY AND ELECTRONIC DEVICE THEREFOR

(71) Applicant: SAMSUNG ELECTRONICS CO., LTD., Suwon-si (KR)

(72) Inventors: Boram Hwang, Suwon-si (KR); Chulmin Kim, Suwon-si (KR); Hyunjoon Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/533,281

(22) Filed: Dec. 8, 2023

(65) Prior Publication Data

US 2024/0134742 A1 Apr. 25, 2024
US 2024/0232006 A9 Jul. 11, 2024

Related U.S. Application Data

(63) Continuation of application No. PCT/KR2022/005364, filed on Apr. 13, 2022.

(30) Foreign Application Priority Data

Jun. 10, 2021 (KR) .................. 10-2021-0075716

(51) Int. Cl.
*G06F 11/10* (2006.01)
*G06F 11/07* (2006.01)

(52) U.S. Cl.
CPC ........ *G06F 11/1016* (2013.01); *G06F 11/076* (2013.01); *G06F 11/1068* (2013.01)

(58) Field of Classification Search
CPC . G06F 11/1068; G06F 11/1016; G06F 11/076
See application file for complete search history.

(56) References Cited

U.S. PATENT DOCUMENTS 6,285,620 B1 9/2001 Ho et al.
9,507,675 B2 * 11/2016 Chun .................. G11C 29/00
(Continued)

FOREIGN PATENT DOCUMENTS

JP 2015011436 A 1/2015
KR 20120061249 A 6/2012
(Continued)

OTHER PUBLICATIONS

International Search Report for PCT/KR2022/005364 mailed Jul. 22, 2022, 5 pages.
(Continued)

*Primary Examiner* — Guy J Lamarre
(74) *Attorney, Agent, or Firm* — Nixon & Vanderhye, P.C.

(57) ABSTRACT

According to various embodiments, an electronic device comprises: at least one processor; and memory operatively connected to the at least one processor, wherein the memory may store instructions which, when executed by the at least one processor, cause the electronic device to: obtain, from a kernel, at least one address for a first memory area accessible through the kernel; store the at least one address in a second memory area accessible through a hypervisor; based on obtaining an address stored in a kernel stack from the kernel, identify whether the obtained address is defective, on the basis of the at least one stored address; and restore the defective address using at least one address stored in the second memory area in response to identifying the defect in the address.

16 Claims, 16 Drawing Sheets

(56) References Cited

U.S. PATENT DOCUMENTS

| | | |
|---|---|---|
| 10,262,135 B1 | 4/2019 | Gu et al. |
| 2005/0044292 A1 | 2/2005 | Mckeen |
| 2007/0101317 A1 | 5/2007 | Shoji et al. |
| 2014/0123286 A1 | 5/2014 | Fischer et al. |
| 2014/0281694 A1 | 9/2014 | Gotsubo et al. |
| 2016/0094552 A1 | 3/2016 | Durham et al. |
| 2017/0017791 A1 | 1/2017 | Brandt et al. |
| 2017/0091454 A1 | 3/2017 | Sukhomlinov et al. |
| 2017/0153908 A1 | 6/2017 | Han et al. |
| 2017/0249178 A1* | 8/2017 | Tsirkin ................. G06F 11/362 |
| 2017/0329961 A1 | 11/2017 | Shanbhogue et al. |
| 2018/0089427 A1 | 3/2018 | Branco |
| 2018/0314582 A1 | 11/2018 | Arimilli et al. |
| 2019/0286465 A1* | 9/2019 | Cui ..................... G06F 9/45533 |
| 2019/0362805 A1 | 11/2019 | Morzano et al. |
| 2020/0168286 A1 | 5/2020 | Fujiwara et al. |
| 2020/0250302 A1 | 8/2020 | Chen et al. |
| 2020/0409595 A1* | 12/2020 | Aslot ................. G06F 16/2282 |
| 2022/0188136 A1* | 6/2022 | Das ..................... G06F 12/0646 |

FOREIGN PATENT DOCUMENTS

| | | |
|---|---|---|
| KR | 20190060109 A | 6/2019 |
| WO | 2005024630 A1 | 3/2005 |

OTHER PUBLICATIONS

Written Opinion of the ISA for PCT/KR2022/005364 mailed Jul. 22, 2022, 3 pages.

\* cited by examiner

MEMORY MANAGEMENT METHOD FOR SECURITY AND ELECTRONIC DEVICE THEREFOR

CROSS-REFERENCE TO RELATED APPLICATIONS

This application is a continuation of International Application No. PCT/KR2022/005364 designating the United States, filed on Apr. 13, 2022, in the Korean Intellectual Property Receiving Office and claiming priority to Korean Patent Application No. 10-2021-0075716, filed on Jun. 10, 2021, in the Korean Intellectual Property Office, the disclosures of each of which are incorporated by reference herein in their entireties.

BACKGROUND

Field

The disclosure relates to a memory management method for security and an electronic device therefor.

Description of Related Art

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more. As such, users of electronic devices may use various services, but at the same time, various security issues are emerging.

An electronic device may execute an application and system processes according to software instructions stored in a memory. However, the processes may be changed by malicious software. For example, when an application program with malicious code is executed, data in memory may be corrupted or pointers or return addresses may be damaged to point elsewhere due to the execution of the malicious code, causing system failure.

For example, return-oriented programming (ROP) may be exploited by attackers to gain control of computer systems or other electronic devices, and by manipulating the return address, the system may operate as desired by the attacker rather than working properly.

As described above, in the field of software security, memory corruption vulnerabilities may exist that allows an attacker to escalate privileges for a specific memory area may exist. While it is common to provide security on the kernel side to ensure that a specific memory area cannot be accessed, there are many ways in which the kernel may be attacked, and memory security techniques may be needed to provide better protection against vulnerabilities in memory.

SUMMARY

Embodiments of the disclosure provide a memory management method for security to ensure security in a reliable manner and an electronic device for the same.

According to various example embodiments, an electronic device may comprise: at least one processor and memory operatively connected with the at least one processor, the memory storing instructions that, when executed by the at least one processor, cause the electronic device to: obtain, from a kernel, at least one address for a first memory area accessible through the kernel, store the at least one address in a second memory area accessible through a hypervisor based on obtaining an address stored in a kernel stack from the kernel, identify whether the obtained address is defective based on the stored at least one address, and recover the defective address using at least one address stored in the second memory area in response to identifying the defect in the address.

According to various example embodiments, a memory management method for security in an electronic device may comprise: obtaining, from a kernel, at least one address for a first memory area accessible through the kernel, storing the at least one address in a second memory area accessible through a hypervisor, based on obtaining an address stored in a kernel stack from the kernel, identifying whether the obtained address is defective based on the stored at least one address, and recovering the defective address using at least one address stored in the second memory area in response to identifying the defect in the obtained address.

According to various example embodiments, a non-volatile storage medium storing instructions, wherein the instructions are configured to, when executed by at least one processor of an electronic device, cause the electronic device to perform at least one operation, the at least one operation comprising obtaining, from a kernel, at least one address for a first memory area accessible through the kernel, storing the at least one address in a second memory area accessible through a hypervisor, based on obtaining an address stored in a kernel stack from the kernel, identifying whether the obtained address is defective based on the stored at least one address, and recovering the defective address using at least one address stored in the second memory area in response to identifying the defect in the obtained address.

According to various example embodiments, security against vulnerabilities in memory may be enhanced by a hypervisor having a higher privilege level than the kernel.

According to various example embodiments, a return address may be safely protected through a hypervisor and an ROP attack may be efficiently detected even without an additional key or complicated operation.

According to various example embodiments, it is possible to ensure security in a reliable manner by addressing a defect in a return address using a hypervisor having a higher privilege level than the kernel.

According to various example embodiments, performance enhancement may be expected by simultaneously processing identification of whether an address defect occurs when a predetermined amount of data is gathered, using a hypervisor.

Effects of the disclosure are not limited to the foregoing, and other unmentioned effects would be apparent to one of ordinary skill in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

The same or similar reference denotations may be used to refer to the same or similar elements throughout the disclosure.

DETAILED DESCRIPTION

Figure 1:
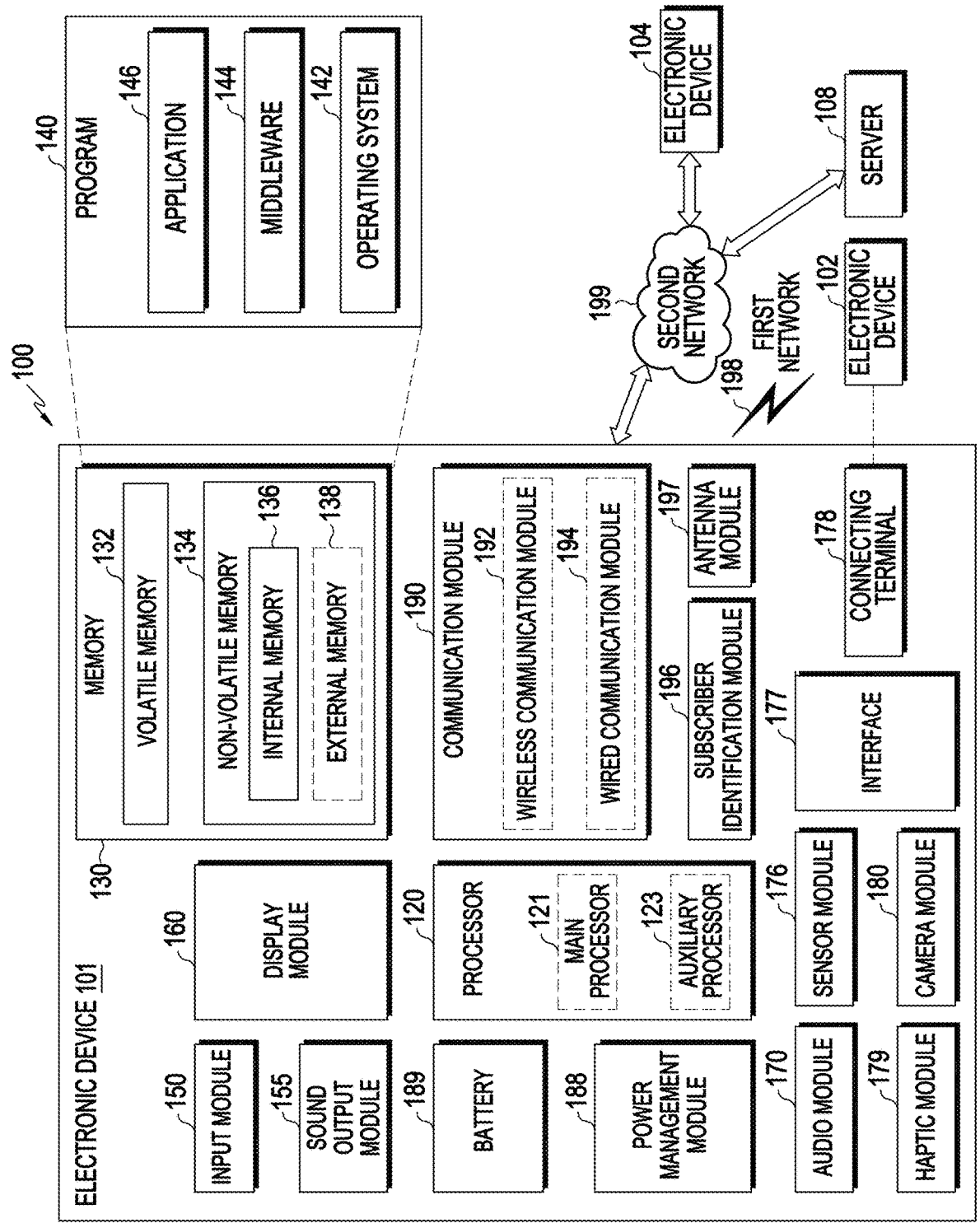
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
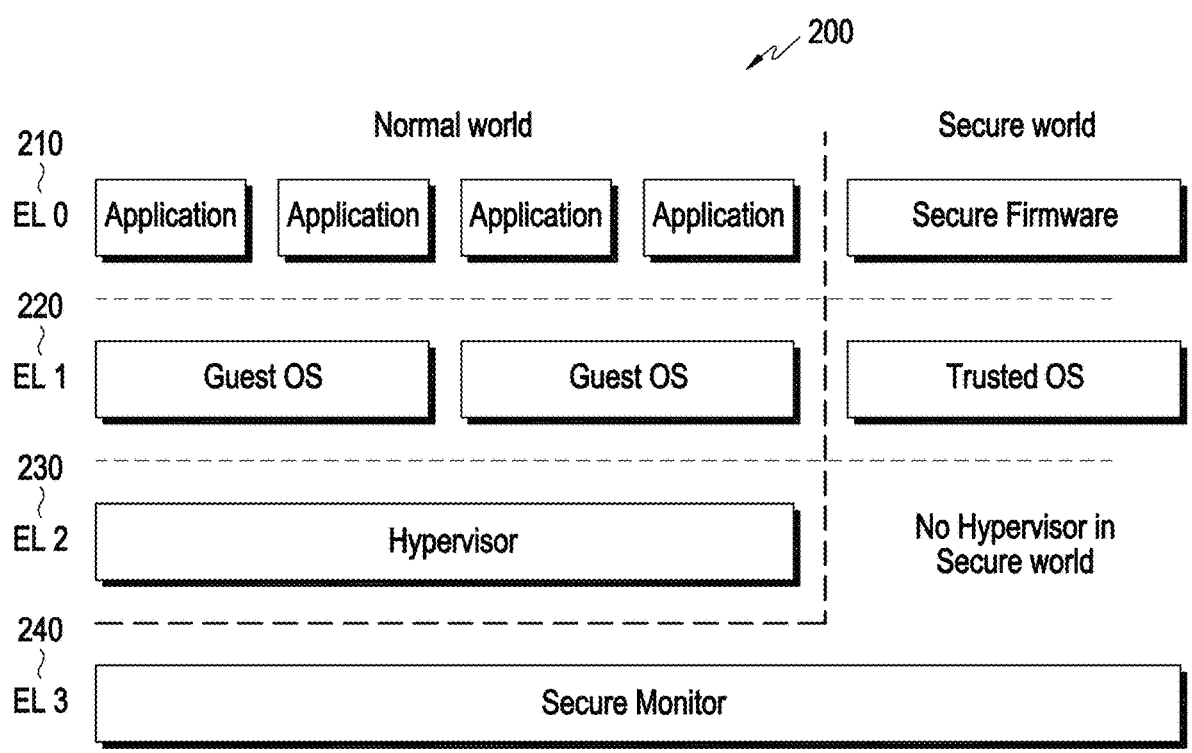
FIG. 2 is a diagram illustrating an exception level in a processor architecture in an electronic device according to various embodiments.

FIG. 2 is a diagram 200 illustrating an exception level in a processor architecture in an electronic device according to various embodiments.

As illustrated in FIG. 2, from a software point of view, an electronic device (e.g., the electronic device 101 of FIG. 1) may be largely divided into a secure world and a non-secure world (normal world). Further, it may be divided into user mode, supervisor mode (or kernel mode), hypervisor mode and secure mode.

Further, in the exception level of the architecture, as shown in FIG. 2, it may be divided into a hierarchy of privilege levels. For example, the hierarchy of privilege levels may be divided into authority levels (or exception levels EL0 (210) to EL3 (240)).

In the user mode (e.g., EL0) 210, the applications runs. In the supervisor mode (e.g., EL1) 220, the kernel code may be executed and, in the hypervisor mode (e.g., EL2) 230, the guest OS may be controlled through a hypervisor, and in the secure mode (e.g., EL3) 240, the trust zone may be executed as the secure monitor operates.

As illustrated in FIG. 2, as the privilege level increases in the order of EL0 210→EL1 220→EL2 230→EL3 240, and the level of authority to access resources in the memory area is also high, e.g., the security level of the EL2 230 may be higher than that of the EL1 220.

Figure 3:
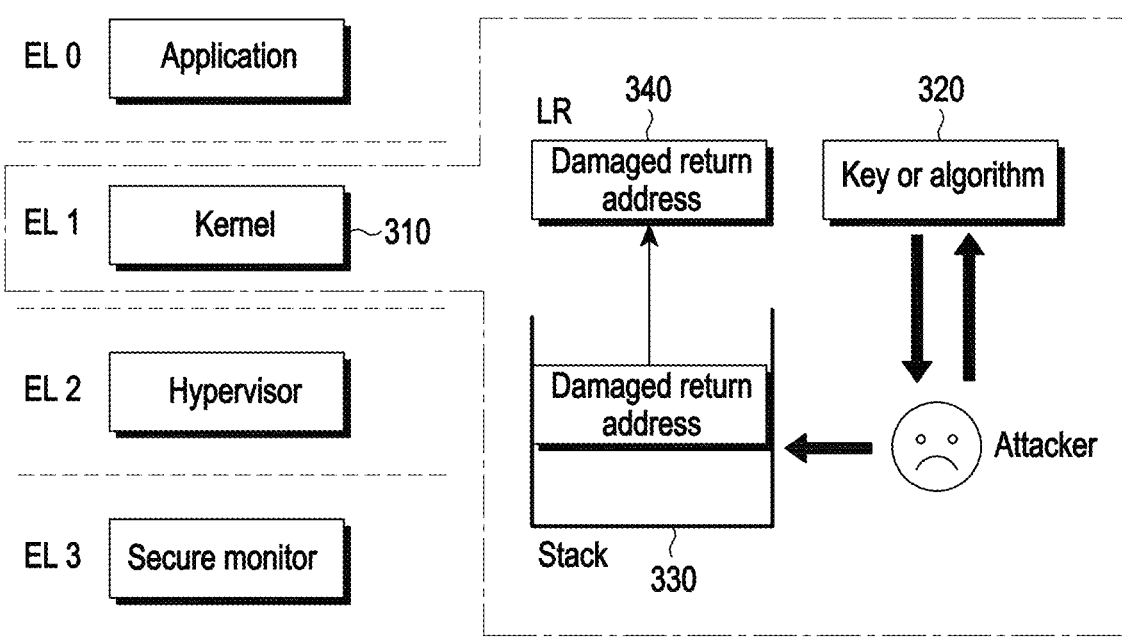
FIG. 3 is a diagram illustrating a memory management method for security through a kernel area according to various embodiments.
Figure 4:
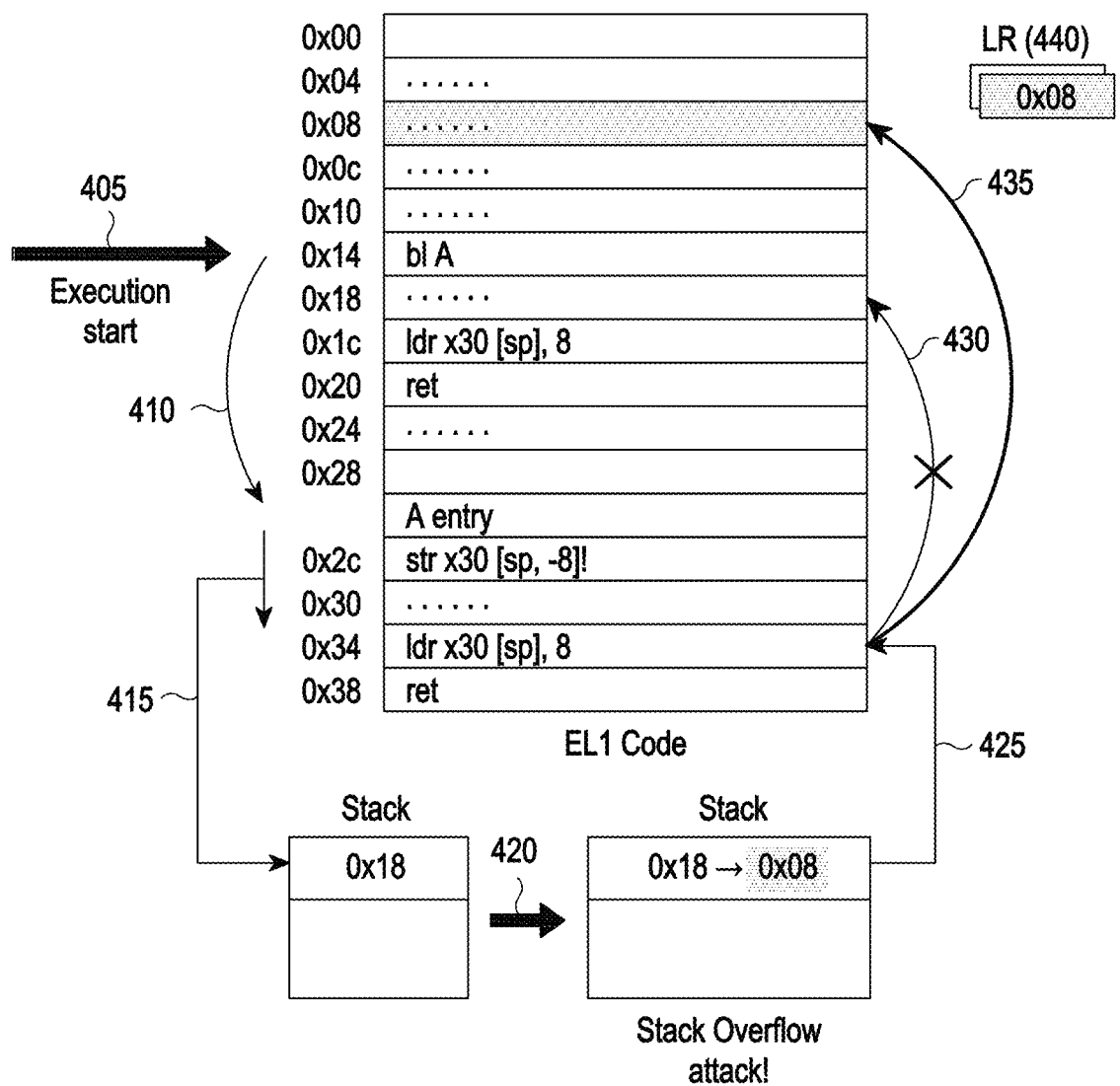
FIG. 4 is a diagram illustrating an example of ROP attack in a kernel area according to various embodiments.

FIG. 3 is a diagram illustrating an example memory management method for security through a kernel area according to various embodiments, and FIG. 4 is a diagram illustrating an example of a ROP attack in the kernel area according to various embodiments.

As illustrated in FIG. 3, ROP attack causes an overflow of the return address stored on the stack 330 of the kernel 310 to change the return address to be loaded onto the link register (link register) 340 or attack a key added to prevent the same or other algorithms 320 to allow code desired by the attacker to run. Accordingly, a return address damaged by manipulation may be stored in the LR 340.

Referring to FIG. 4 to describe the ROP attack in greater detail, if kernel code (or process) is started to run by the kernel 310 (405), commands at corresponding addresses may be sequentially executed. For example, if function A at address 0x14 (e.g., 'bl A') is executed, the kernel 310 may move (410) to the address for executing function A (410) and store (415) the return address (e.g., 0x18) in the kernel stack to be able to return to the next address (e.g., 0x18) of the current address (e.g., 0x14). Here, the return address stored in the kernel stack may be an address of 0x18, which is an address value obtained by adding 4 to the current address value. In this case, when the stack overflow attack 420 occurs and the return address (e.g., 0x18) stored in the kernel stack is manipulated to a malicious return address (e.g., 0x08), the kernel 310 may store the return address in the kernel stack in the LR 440 through the ldr instruction 425 before returning after finishing the A function operation.

Accordingly, the manipulated return address (e.g., 0x08) may also be stored in the LR 440. Since the return address stored in the kernel stack 430 is a return address changed by malicious manipulation, jumping 435 may occur to the manipulated return address (e.g., 0x08) rather than the address corresponding to the return address (e.g., 0x18) 430. When the operation of the kernel 310 reaches the ret instruction as described above, the ROP attack may be started because the unintended code is executed.

Meanwhile, in order to prevent the ROP attack as described above, there are various methods such as a method of storing addresses and metadata in memory, a method of encrypting the return address, a method of performing an XOR operation on a key, a method of obtaining a hash value, a method of generating a table for valid addresses, and a method of checking a gadget.

However, as illustrated in FIG. 3, as various methods for preventing an ROP attack operate on the kernel 310, and the kernel code is an open source, the above-described methods may not normally work when a vulnerability occurs in the kernel 310.

Therefore, it is necessary to consider a method for enhancing security for vulnerability in memory using a hypervisor having a higher authority level than the kernel.

Hereinafter, a memory management method for enhancing security for a vulnerability in a memory through a hypervisor having a higher authority level than the kernel and operations of an electronic device for the memory management method are described in greater detail below with reference to the drawings.

Figure 5:
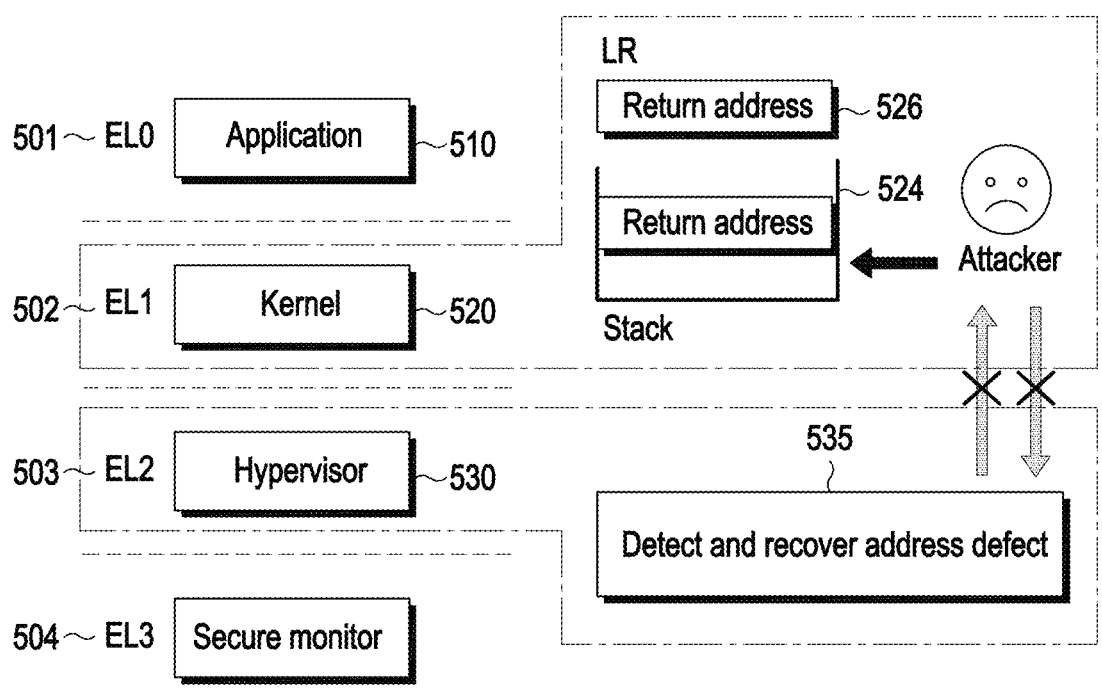
FIG. 5 is a diagram illustrating a memory management method for security through a hypervisor according to various embodiments.

FIG. 5 is a diagram illustrating an example memory management method for security through a hypervisor according to various embodiments.

Referring to FIG. 5, in FIG. 5, a structure corresponding to each authority level is illustrated, but other modules (or components) may be included. For example, the privilege level hierarchy may be divided into authority levels (or exception levels EL0 501 to EL3 504). The user mode may be referred to as EL0 501, the supervisor mode may be referred to as EL1 502, the hypervisor mode may be referred to as EL2 503, and the security mode may be referred to as EL3 504.

The kernel 520 may refer, for example, to a component of the operating system, and may be executed in the supervisor mode, and may perform a control operation between the application 510 and the hypervisor 530. The kernel 520 may include program execution, interrupt, multitasking, memory management, a file system, and a device driver.

The kernel 520 may be the most important core of the computer operating system and provides various basic services to all other parts of the operating system. In general, the kernel includes an interrupt processor that processes all requests that competitively require a kernel service, such as a terminated input/output operation, a scheduler that determines in what order which programs will share the processing time of the kernel, and a supervisor that actually grants a computer use authority to each process after the schedule is ended.

The kernel 520 may include a memory manager that manages the address space of the operating system in a memory or a storage device and evenly distributes the address space to all peripheral devices and other users who use services of the kernel. The service of the kernel 520 may be requested through another part of the operating system or a series of program interfaces known as system calls. Since the code for maintaining the kernel 520 is continuously used, the kernel 520 may be loaded in a protected memory area so as not to be damaged by being overlaid by the remaining part of the operating system that is not frequently used.

The kernel 520 may allocate resources of the electronic device 101 by connecting and managing the interactions between the physical components of the device hardware and the individual middleware of the operating system. For example, the device hardware may include various hardware devices and may be devices coupled to the processor (e.g., the processor 120 of FIG. 1) configured to perform various functions and operations.

For example, the device hardware may include a memory combined with the processor (e.g., the processor 120 of FIG. 1), and the memory (e.g., the memory 130 of FIG. 1) may store computer-executable instructions configured to perform various functions and operations related to the memory management method for security.

A hypervisor may include a logical platform for simultaneously executing multiple operating systems by allowing different operating systems to access system resources such as memory and CPU.

According to various embodiments, even if manipulation of the kernel code operated by the kernel 520 is continuously attempted, the hypervisor 530 may detect the manipulation and recover the manipulation to the original state. For example, even if an attack for manipulating the return address stored in the stack 524 of the kernel 520 occurs, the hypervisor 530 may detect and recover the address defect 535 to load the undamaged return address to the LR 526. Further, according to various embodiments, the hypervisor 530 may identify whether the number of detections of an address defect exceeds a threshold number, determine that it is a continuous manipulation attempt when a situation exceeding the threshold number occurs, and terminate the system to prevent additional memory damage caused by the manipulation attempt.

Therefore, according to various embodiments, even if a defect occurs in the return address, it is possible to recover the defective address using a hypervisor having a higher authority level than the kernel, thereby ensuring security in a reliable manner.

Figure 6A:
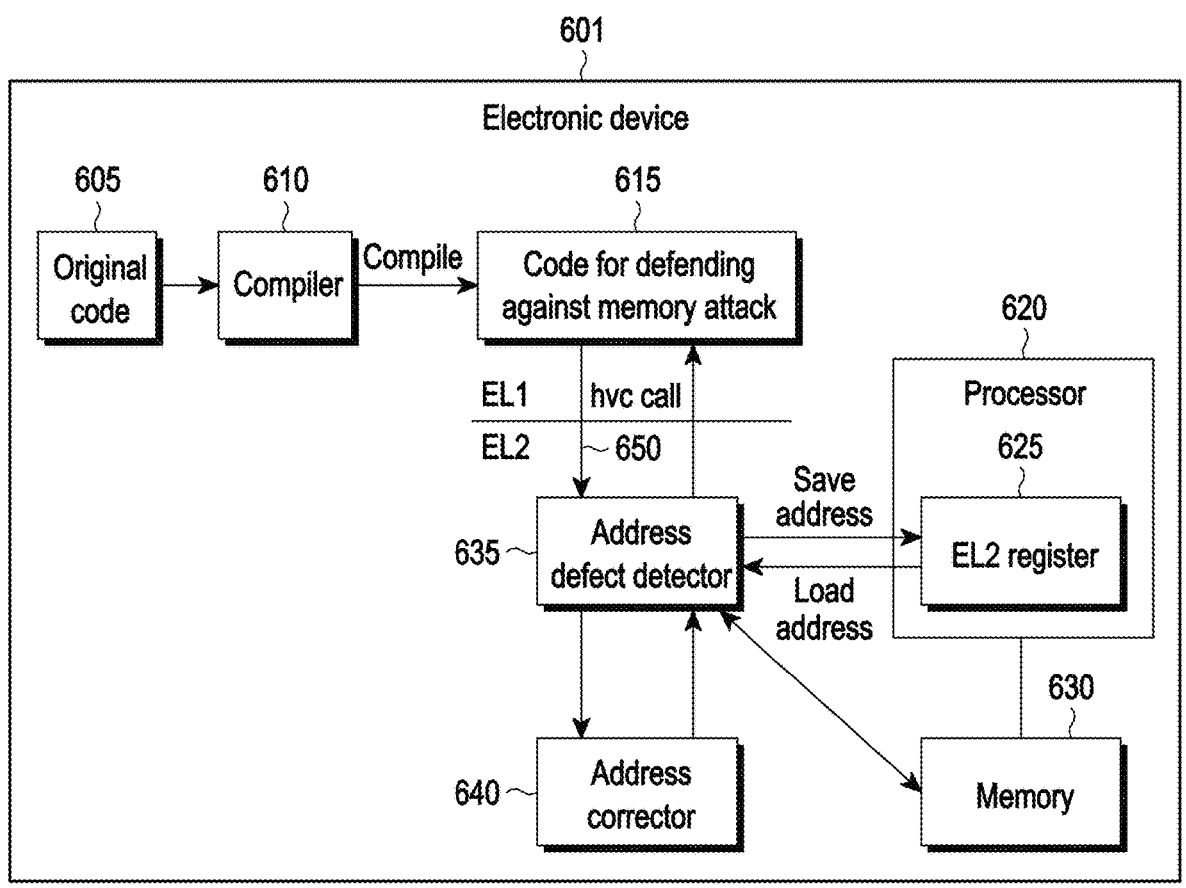
FIG. 6A is a block diagram illustrating an example configuration of an electronic device according to various embodiments.

FIG. 6A is a block diagram illustrating an example configuration of an electronic device according to various embodiments.

The electronic device 601 of FIG. 6A may be a device that processes a memory security operation based on a hypervisor. Referring to FIG. 6A, a hypervisor-based electronic device 601 according to various embodiments may include at least one processor (e.g., including processing circuitry) 620, a memory 630 operatively connected to the at least one processor 620, an address defect detector (e.g., including circuitry and/or executable program instructions) 635, and an address corrector (e.g., including circuitry and/or executable program instructions) 640. According to an embodiment, FIG. 6A illustrates the address defect detector 635 and the address corrector 640, but operations of the address defect detector 635 and the address corrector 640 may be performed by the processor 620 operating in the hypervisor mode (e.g., EL2). Accordingly, the address defect detector 635 and the address corrector 640 are components operating in the hypervisor mode and may be implemented as software modules and/or hardware.

According to various embodiments, the electronic device 601 may further include an EL2 register 625. The EL2 register 625 is a memory area accessible only through the hypervisor 530, and may be used to store a return address related to the kernel 520. For example, the register (or memory area) in the hypervisor mode on the processor 620 may be referred to as an EL2 register. In other words, a register usable in the hypervisor mode (e.g., EL2) may be an EL2 register, and the EL2 register may be a register that may not be accessed or modified in the supervisor mode (e.g., EL1).

According to an embodiment, the processor 620 may include various processing circuitry (as used herein, including the claims, the term "processor" may include various processing circuitry, including at least one processor, wherein one or more processors of the at least one processor may be configured to perform the various functions described herein) and include an independent hardware register accessible by each of the kernel 520 and the hypervisor 530, and only the EL2 register 625, which is a register accessible by the hypervisor 530, is illustrated, but this is merely an example, and the processor 620 may include other registers that are not accessible by EL1 or EL0 but are accessible by EL2. In order to prevent an address defect from occurring due to manipulation of the kernel code operating in the kernel 520, the processor 620 may identify whether the address is defective through the hypervisor 530 instead of the kernel 520 and recover the defective address.

The processor 620 according to various embodiments may change the operation in the supervisor mode to the hypervisor mode and operate. According to an embodiment, the mode operating in EL1 may be the supervisor mode of the processor 620, and the mode operating in EL2 may be the hypervisor mode of the processor 620.

According to various embodiments, the original code 605 may be compiled into a code 615 for defending against a memory attack by the compiler 610. Here, as an example of the code for defending against a memory attack, a code for defending against an ROP attack may be mentioned. According to an embodiment, the code 615 for defending against a memory attack through compiling (e.g., code for defending against an ROP attack) is a code modified to call the hypervisor mode from the original code operating in the supervisor mode. For example, the code defending the ROP attack may be an executable code (or executable file) modified to prevent the ROP attack.

According to various embodiments, a compiler different from the compiler 610 may generate a code for identifying an address defect in the hypervisor mode to prevent an ROP attack.

According to various embodiments, if the system is started, the compiler 610 may add an instruction for calling the hypervisor 530 from the kernel 520 to the original code (or executable file) 605.

According to an embodiment, the call instruction for calling the hypervisor may be a hypervisor call (e.g., hvc) 650. The compiler 610 is described in greater detail below with reference to FIG. 6B.

Figure 6B:
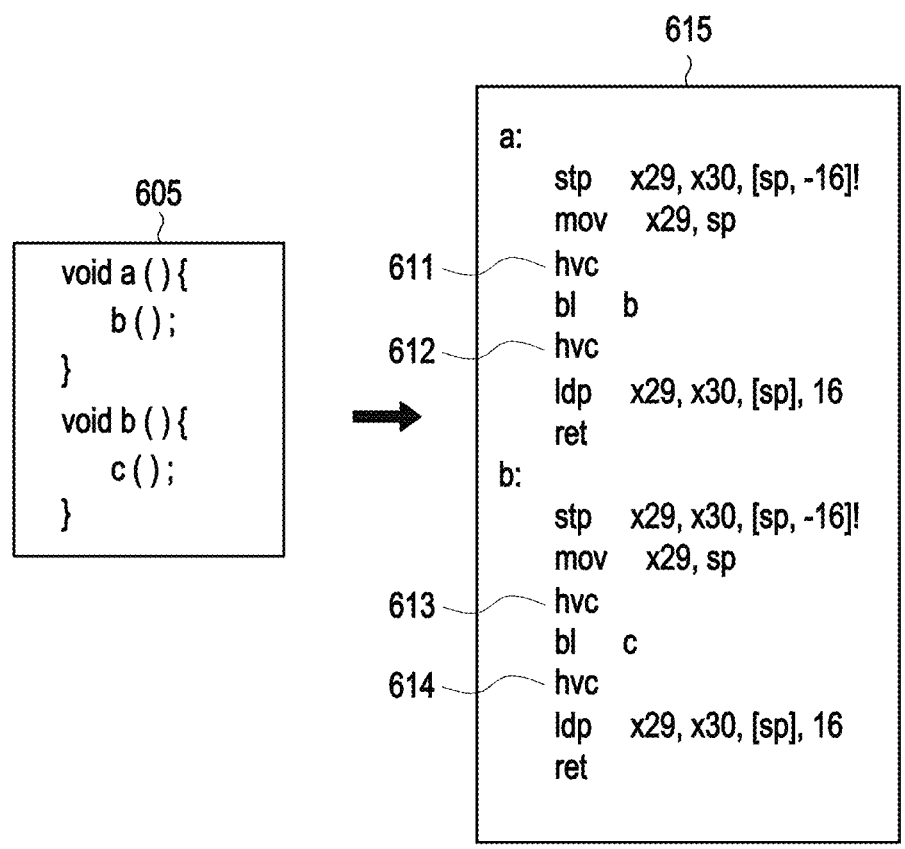
FIG. 6B is a diagram illustrating an example of a compiler according to various embodiments.

FIG. 6B is a diagram illustrating an example of a compiler according to various embodiments.

For example, referring to FIG. 6B, the compiler 610 may add, to the original code (or original function) (e.g., executable file) 605, an instruction for calculating a return address to be returned before a branch command (or instruction) and an instruction for transferring an address from the kernel 520 to the hypervisor 530 through the hypervisor calls 611 and 612.

Further, the compiler 610 may add, to the epilogue of the original function, an instruction for importing (or loading) the return address in the stack in the kernel 520 before the ret instruction, and a hypervisor call 613 and 614 instruction for converting to the hypervisor 530 mode to identify the return address of the kernel stack.

The one or more instructions may include code executable by the code generated by the compiler 610. Accordingly, the processor 620 of the electronic device 601 may call at least one of the one or more instructions, may execute the at least one instruction, and may perform at least one function according to the at least one called instruction.

According to various embodiments, the address defect detector 635 and the address corrector 640 may include components operating in the hypervisor mode corresponding to the authority level EL2 higher than the authority level EL1 in the supervisor mode. For example, the address defect detector 635 may be referred to as a ROP check module, and the address correction module may also be referred to as an address recovery module.

According to various embodiments, the operations of the address defect detector 635 may be divided into the operation of storing at least one address for the first memory area accessible through the kernel 520 and the operation of identifying whether the address is defective using the stored address, and the operation of recovering the defective address by the address corrector 640.

The operation of storing the address used to identify whether an address is defective according to various embodiments is described. The address defect detector 635 may receive a call instruction for transferring at least one address (e.g., a first address) for a first memory area in the kernel 520 from the kernel 520 to the hypervisor 530. For example, the first address may be a return address of a caller or a return address of a function. For example, the return address may be transferred by the kernel 520.

According to various embodiments, the address defect detector 635 may obtain the first address through the call instruction and may authenticate the obtained first address. For example, the address defect detector 635 may identify whether the obtained first address actually corresponds to a memory address space managed (or accessible) by the kernel 520. If the obtained address is included in the address area managed by the kernel 520, the address defect detector 635 may regard the obtained first address as a normal address belonging to the area accessible by the kernel and store the same in a second memory area (e.g., the EL2 register 625) accessible through the hypervisor 530. The address, if inaccessible by the kernel, may be determined to have been damaged.

The first address stored in the EL2 register 625 may be used to determine whether the memory area related to the kernel 520 is damaged. For example, the address defect detector 635 may use the address stored in the EL2 register 625 to determine whether there is an ROP attack to the kernel 520.

According to various embodiments, it may be necessary to verify the address to which to be returned before returning to the previous function after all operations of the called function are finished. To that end, the return address currently stored in the kernel stack is transmitted to the hypervisor 530 through a hypervisor call (hvc call). In this case, the transmitted address is referred to as a second address.

According to various embodiments, the operation of recovering the defective address is described in greater detail. The address defect detector 635 may receive a call instruction for transferring the second address from the kernel 520. For example, one process is described as an example. As functions in the corresponding process are sequentially executed, the address defect detector 635 may receive an address stored in the stack in the kernel 520 from the kernel 520 every time. According to an embodiment, the address defect detector 635 may obtain the second address through the call instruction before the called function returns to the previous function after completing the operation. The address transferred from the kernel 520 to the hypervisor 530 is a return address stored in the kernel stack.

According to various embodiments, the address defect detector 635 may obtain the second address through the call instruction and may authenticate the obtained second address. If the authentication is successful, e.g., if the obtained second address is included in the address area related to the kernel 520, the address defect detector 635 may identify whether the obtained second address is defective, based on at least one first address stored in the EL2 register 625.

According to various embodiments, the address defect detector 635 may identify whether the second address is defective by comparing the first address stored in the EL2 register 625 with the second address obtained through the call instruction. According to an embodiment, the address defect detector 625 may identify whether there is a defect by performing an XOR operation on the address stored in the EL2 register 625 and the address obtained through the call instruction.

According to an embodiment, when no address defect occurs, the address defect detector 635 may return to the kernel 520. For example, the processor 620 may operate in the hypervisor mode to determine a defect caused by the ROP attack, and may switch (or return) to the supervisor mode after completing the defect determination operation.

On the other hand, according to an embodiment, when an address defect occurs, the address defect detector 635 may notify the address corrector 640 of the occurrence of the defect. For example, the address defect detector 635 may call the address corrector 640 in response to the occurrence of the address defect. Accordingly, the address corrector 640 may take the first address stored in the EL2 register 625 to recover the defective second address, and may recover the return address damaged in the stack of the kernel 520 to the address stored in the EL2 through the SP_EL1 register indicating the kernel stack. Accordingly, even if the damaged address is stored in the stack of the kernel 520, since the damaged address is recovered to the undamaged address (e.g., the first address), it is possible to prevent a change in operation flow due to memory damage and an attack.

According to various embodiments, the address corrector 640 may count the number of defect detections. For example, the address corrector 640 may increase the number of detections by one as an address defect is detected, and when the number of detections exceeds a threshold number, the address corrector 640 may determine that it is a continuous manipulation attempt and terminate the system to prevent additional memory damage caused by the manipulation attempt. On the other hand, in the state in which the threshold number is not exceeded, the address corrector 640 may recover the address stored in the EL2 register 625 to the stack of the kernel 520 in response to detection of the address defect, thereby recovering the defective address to the original address before the defect occurs.

In the above description, when a call instruction for transferring a return address to the hypervisor 530 is received, the address defect detector 635 may identify whether the address obtained through the call instruction is defective. However, according to an embodiment, the address defect detector 635 may collect the addresses obtained through call instructions in a predetermined unit and collectively identify whether the addresses are defective.

According to various embodiments, when the call instruction is received, the address defect detector 635 may temporarily store the address obtained through the call instruction in a third memory area accessible through the hypervisor 530. Here, the third memory area may be an area, e.g., a DRAM area, allocated in the memory 630. The third memory area is an area that is not accessible through the kernel 520, whereas the third memory area is an area that is accessible only through the hypervisor 530.

According to various embodiments, after storing addresses in the third memory area in the form of a list, the address defect detector 635 may identify whether the address list is defective at once when a certain amount of data, e.g., addresses included in the list, reaches a certain number.

According to various embodiments, in order to identify whether the address list is defective, the address defect detector 635 may compare and delete neighboring addresses in the address list, and may identify whether the remaining addresses after deletion are defective. Such an address defect detection method may be referred to as an asynchronous method, which is described in greater detail below with reference to FIGS. 12 to 15. As described above, according to various embodiments, when identifying whether addresses are defective in a predetermined number of list units, the process execution speed may be enhanced.

Operations in the kernel 520 and the hypervisor 530 as described above may be performed according to instructions (or one or more commands) stored in the memory 630 connected to the at least one processor 620 in the electronic device 601. According to an embodiment, the instruction corresponding to the operation in the hypervisor 530 may include codes operating in the hypervisor 530, and the codes may be referred to as modules. For example, the module operating in the hypervisor 530 may recover the damaged address stored in the kernel stack to at least one address information stored in a memory area accessible from the hypervisor 530.

According to various example embodiments, an electronic device may comprise: at least one processor and memory operatively connected with the at least one processor, wherein the memory stores instructions that, when executed by the at least one processor, cause the electronic device to: obtain, from a kernel, at least one address for a first memory area accessible through the kernel, store the at least one address in a second memory area accessible through a hypervisor, based on obtaining an address stored in a kernel stack from the kernel, identify whether the obtained address is defective based on the stored at least one address, and recover the defective address using at least one address stored in the second memory area in response to identifying the defect in the address.

According to various example embodiments, the instructions, when executed, may cause the electronic device to obtain the at least one address through an invocation instruction for transferring the at least one address for the first memory area to the hypervisor from the kernel.

According to various example embodiments, the instructions, when executed may cause the electronic device to identify whether the at least one address is included in an address area related to the kernel in response to obtaining the at least one address and, based on the at least one address being included in the address area related to the kernel, store the at least one address in the second memory area.

According to various example embodiments, the instructions, when executed, may cause the electronic device to identify whether the obtained address is included in an address area related to the kernel through an invocation instruction for transferring the address to the hypervisor from the kernel and, based on the obtained address being included in the address area related to the kernel, identify whether the obtained address is defective based on the stored at least one address.

According to various example embodiments, the instructions, when executed, may cause the electronic device to, based on an address stored in the kernel stack being obtained through the invocation instruction, identify whether the obtained address is defective.

According to various example embodiments, the instructions, when executed, may cause the electronic device to, based on an address stored in the kernel stack being obtained through the invocation instruction, store the obtained address in a third memory area accessible through the hypervisor and manage the address stored in the third memory area in a form of a specified number of lists and identify whether the address list is defective.

According to various example embodiments, the instructions, when executed, may cause the electronic device to, based on comparing neighboring addresses in the address list, based on the neighboring addresses being the same, delete the neighboring addresses, and identify whether remaining addresses after the deletion have a defect.

According to various example embodiments, the instructions, when executed, may cause the electronic device to compare the stored at least one address with the obtained address and, based on a result of the comparison not matching, identify that the obtained address is defective.

According to various example embodiments, the instructions, when executed, may cause the electronic device to count a number of times in which the result of the comparison does not match and, based on the count being a specified threshold or more, recover the defective address using at least one address stored in the second memory area.

According to various example embodiments, each of the second memory area and the third memory area may include an area accessible through the hypervisor but inaccessible through the kernel.

Meanwhile, although the operation of various components in the electronic device 601 has been described above, the operation of the various components may be implemented using a system on chip (hereinafter, SoC) chipset. According to an embodiment, the SoC chipset may include various functional blocks, such as a processor 620 and a memory interface (not shown). For example, an application processor (AP) of the electronic device 601 may drive the OS and applications required in the electronic device 601, and may be included in a SoC chipset category including the blocks of FIG. 6A.

According to various embodiments, the SoC chipset including the processor 620 may support a normal mode and a hypervisor mode. According to an embodiment, a normal mode and a supervisor mode may be included.

According to various embodiments, the SoC chipset may control the operations of obtaining at least one address for a first memory area accessible through a kernel from the kernel while operating in the normal mode, switching to the hypervisor mode to store the at least one address in a second memory area accessible through a hypervisor, when obtaining an address (e.g., return address) stored in a kernel stack from the kernel, identifying whether the obtained address is defective based on the stored at least one address, and recovering the defective address using at least one address stored in the second memory area in response to identifying the defect in the address.

According to an embodiment, the SoC chipset may operate back in the normal mode after storing the at least one address in the second memory area and, when obtaining the address stored in the kernel stack through the hypervisor, switch to the hypervisor mode. Further, the SoC chipset may switch back to the normal mode after recovering the defective address.

Figure 7:
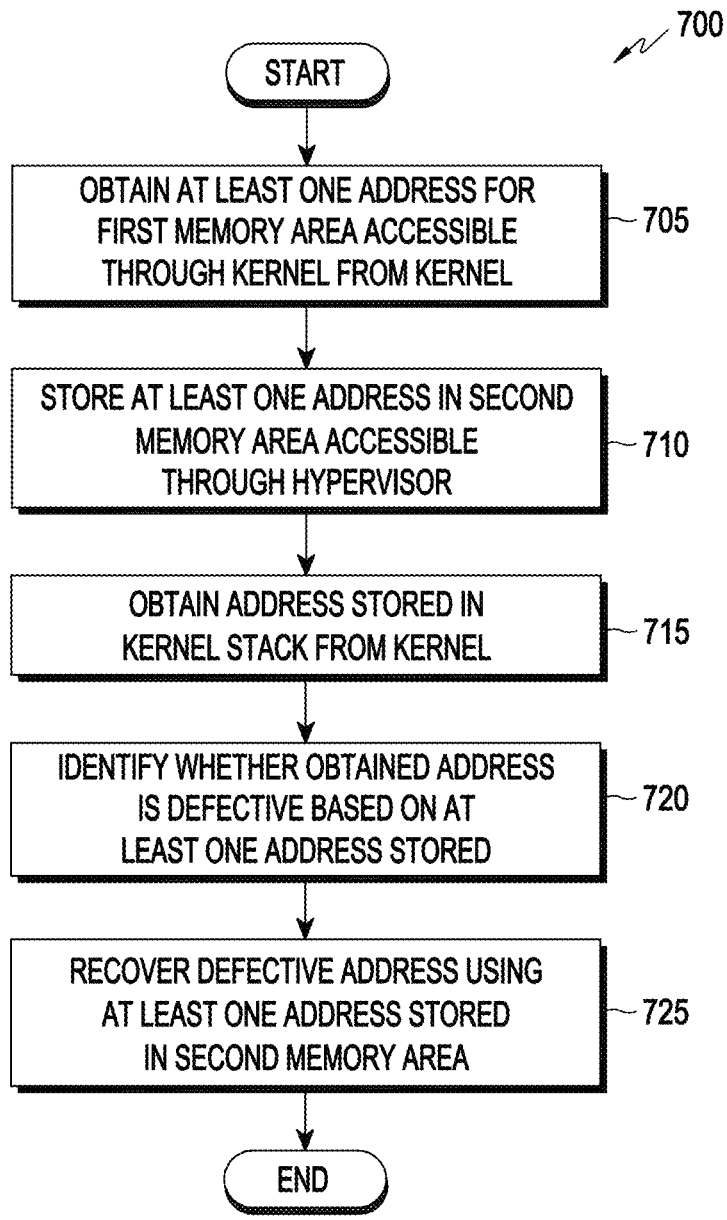
FIG. 7 is a flowchart illustrating an example memory management operation for security of an electronic device according to various embodiments.
Figure 8:
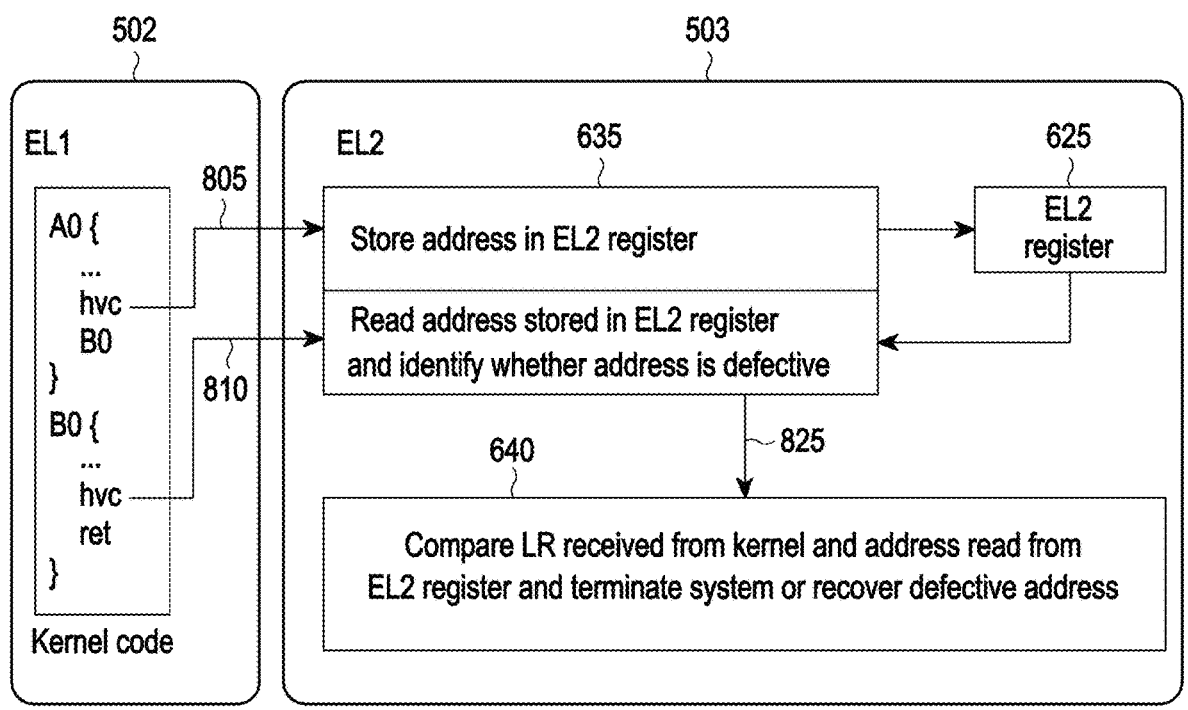
FIG. 8 is a diagram illustrating an example operation through a hypervisor according to various embodiments.

FIG. 7 is a flowchart 700 illustrating an example memory management method for security in an electronic device according to various embodiments. Referring to FIG. 7, the method may include operations 705 to 725. Each step/operation of the operation method of FIG. 7 may be performed by at least one of an electronic device (e.g., the electronic device 101 of FIG. 1 or the electronic device 601 of FIG. 6A) or at least one processor (e.g., at least one of the processor 120 of FIG. 1 or the processor 620 of FIG. 6A) of the electronic device. According to an embodiment, at least one of operations 705 to 725 may be omitted, some operations thereof may be performed in reverse order, or other operations may be added thereto. Hereinafter, reference will be made to FIG. 8 to describe the operation of FIG. 7. FIG. 8 is a diagram illustrating an example operation through a hypervisor according to various embodiments.

Referring to FIG. 7, in operation 705, the electronic device 601 may obtain, from the kernel 520, at least one address for a first memory area accessible through the kernel 520. According to various embodiments, obtaining the at least one address for the first memory area may include obtaining the at least one address through a call instruction for transferring the at least one address for the first memory area from the kernel 520 to the hypervisor 530.

An operation in which the hypervisor 530 may obtain at least one address for the first memory area is described with reference to FIG. 8 as follows. As illustrated in FIG. 8, when the A function is started when the kernel code is executed in the EL1 502, the return address in the A function may be transferred to the hypervisor 530 through the hypervisor call 805 before calling the B function. In this case, the return address may be calculated in the supervisor mode corresponding to the EL1 502 before calling the B function, and the operation of transferring the address through the hypervisor call 805 may be performed in the hypervisor mode in the kernel.

According to an embodiment, the electronic device 601 may be switched from the supervisor mode to the hypervisor mode by the call instruction for transferring the address through the kernel 520 and operated. For example, an operation for ROP defending may be performed by the hypervisor 530 of the EL2 503, which has a higher authority level than the kernel 520 of the EL1 502.

In operation 710, the electronic device 601 may store the at least one address in a second memory area accessible through the hypervisor 530.

According to various embodiments, storing the at least one address in the second memory area may include identifying whether the at least one address is included in an address area related to the kernel 520 in response to obtaining the at least one address and, when the at least one address is included in the address area related to the kernel 520, storing the at least one address in the second memory area.

According to an embodiment, as illustrated in FIG. 8, the at least one address may be transferred to the address defect detector 635 operating in the EL2 503, and the address defect detector 635 may store the transferred address in the EL2 register 625. For example, when the second memory area accessible through the hypervisor 530 is referred to as the EL2 register 625, the address stored in the EL2 register 625 may be referred to as the first address.

According to various embodiments, as illustrated in FIG. 8, the operations of the address defect detector 635 may be largely divided into the operation of storing the transferred address in the EL2 register 625 and the operation of identifying whether the address is defective using the address stored in the EL2 register 625. On the other hand, according to various embodiments, the operations of the address corrector 640 may be divided into the operation of terminating the system when a defect occurs or the operation of recovering the defective address.

In operation 715, the electronic device 601 may obtain the address stored in the kernel stack from the kernel 520, and in operation 720, the electronic device 601 may identify whether the obtained address is defective, based on the at least one stored address. For example, the electronic device 601 may obtain the address stored in the kernel stack through a call instruction for transferring the address (e.g., a return address) stored in the kernel stack from the kernel 520 to the hypervisor 530. Accordingly, the electronic device 601 may identify whether the obtained address (e.g., the return address) is defective, using the address stored in the EL2 register 625.

In response to identifying the defect in the obtained address, in operation 725, the electronic device 601 may recover the defective address using at least one address stored in the second memory area. For example, when a defect occurs, the electronic device 601 may recover the original address before the defect occurs using the address stored in the EL2 register 625.

According to an embodiment, as illustrated in FIG. 8, before starting the next function (e.g., function B) and returning to the previous function (e.g., function A), the return address stored in the supervisor mode stack corresponding to the EL1 502 is transferred to the hypervisor through the hypervisor call 810.

In response to the hypervisor call 810, the address defect detector 635 may read the address stored in the EL2 register 625. Then, the address defect detector 635 may compare the stored address with the address obtained through the hypervisor call 810. According to an embodiment, when a defect occurs as a result of comparison, the address defect detector 635 may notify the address corrector 640 of the occurrence of the defect (825). For example, the address defect detector 635 may call the address corrector 640 in response to the occurrence of the address defect.

Meanwhile, in the above description, an example where the comparison operation between the addresses is performed by the address defect detector 635 has been described, but otherwise, the comparison operation between the addresses may be performed by the address corrector 640. Accordingly, the address corrector 640 may compare the return address received from the kernel 520 with the address read from the EL2 register 625, and may terminate the system or recover the defective address based on the comparison result and then return to the kernel 520.

According to various embodiments, identifying whether the obtained address is defective may include identifying whether the obtained address is included in an address area related to the kernel through an invocation instruction for transferring the address to the hypervisor from the kernel and, when the obtained address is included in the address area related to the kernel, identifying whether the obtained address is defective based on the stored at least one address.

According to various embodiments, identifying whether the obtained address is defective may include, when an address stored in the kernel stack is obtained through the invocation instruction, identifying whether the obtained address is defective.

According to various embodiments, identifying whether the obtained address is defective may include, when an address stored in the kernel stack is obtained through the invocation instruction, storing the obtained address in a third memory area accessible through the hypervisor and managing the address stored in the third memory area in a form of a predetermined number of lists and identifying whether the address list is defective.

According to various embodiments, identifying whether the address list is defective may include, after comparing neighboring addresses in the address list and, if the neighboring addresses are the same, deleting the neighboring addresses, and identifying whether remaining addresses after the deletion are defective.

According to various embodiments, identifying whether the obtained address is defective may include comparing the stored at least one address with the obtained address and, when a result of the comparison does not match, identifying that the obtained address is defective.

According to various embodiments, recovering the defective address using the at least one piece of address information stored in the second memory area may include counting a number of times in which the result of the comparison does not match and, when the count is a preset threshold or more, recovering the defective address using at least one address stored in the second memory area. For example, the damaged address stored in the kernel stack may be recovered to at least one address information stored in the second memory area.

According to various embodiments, each of the second memory area and the third memory area may be an area accessible through the hypervisor but inaccessible through the kernel.

As described above, the electronic device 601 may ensure security in a reliable manner by addressing a defect in a return address using a hypervisor having a higher privilege level than the kernel. Further, according to various embodiments, performance enhancement may be expected by simultaneously processing identification of whether an address defect occurs when a predetermined amount of data is gathered.

Figure 9:
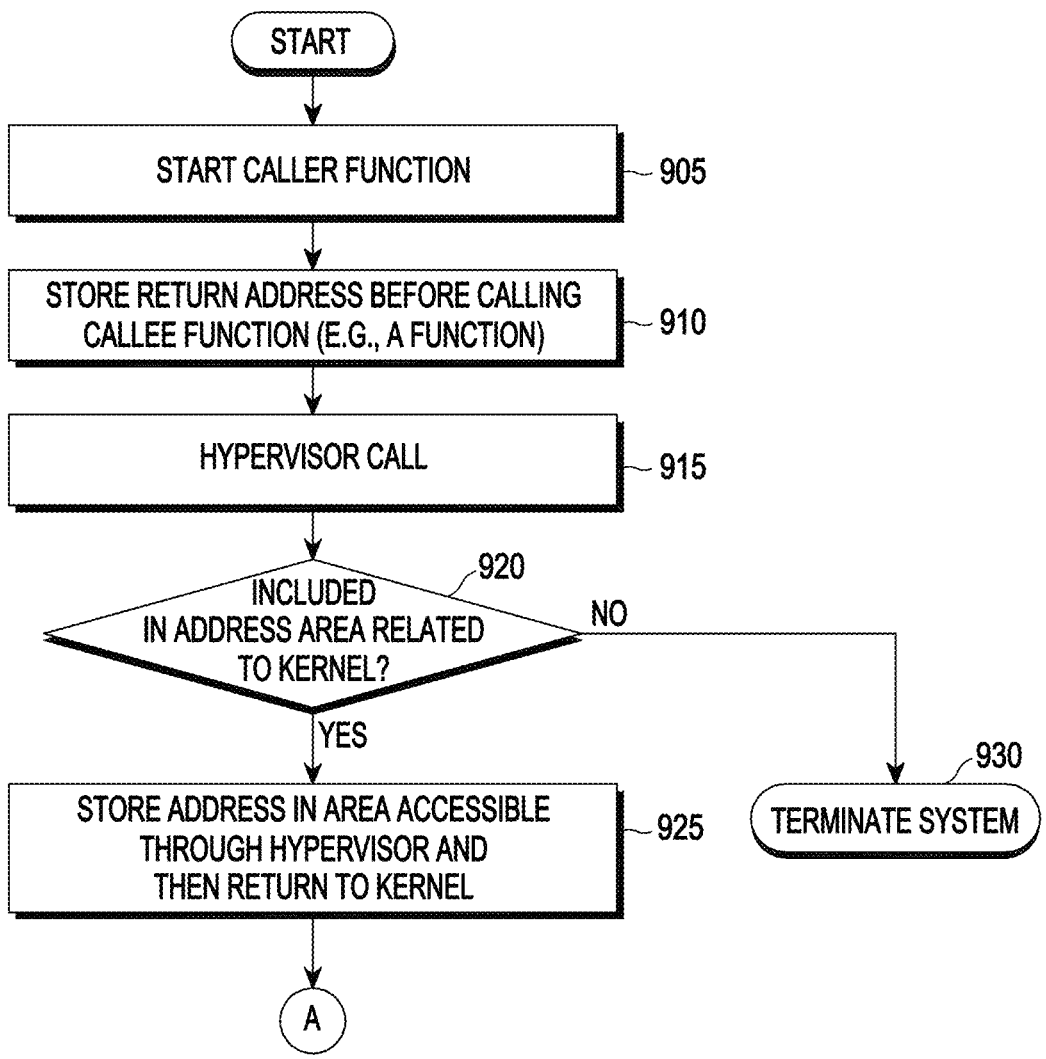
FIG. 9 is a flowchart illustrating example operations in a hypervisor and a kernel according to various embodiments.
Figure 10:
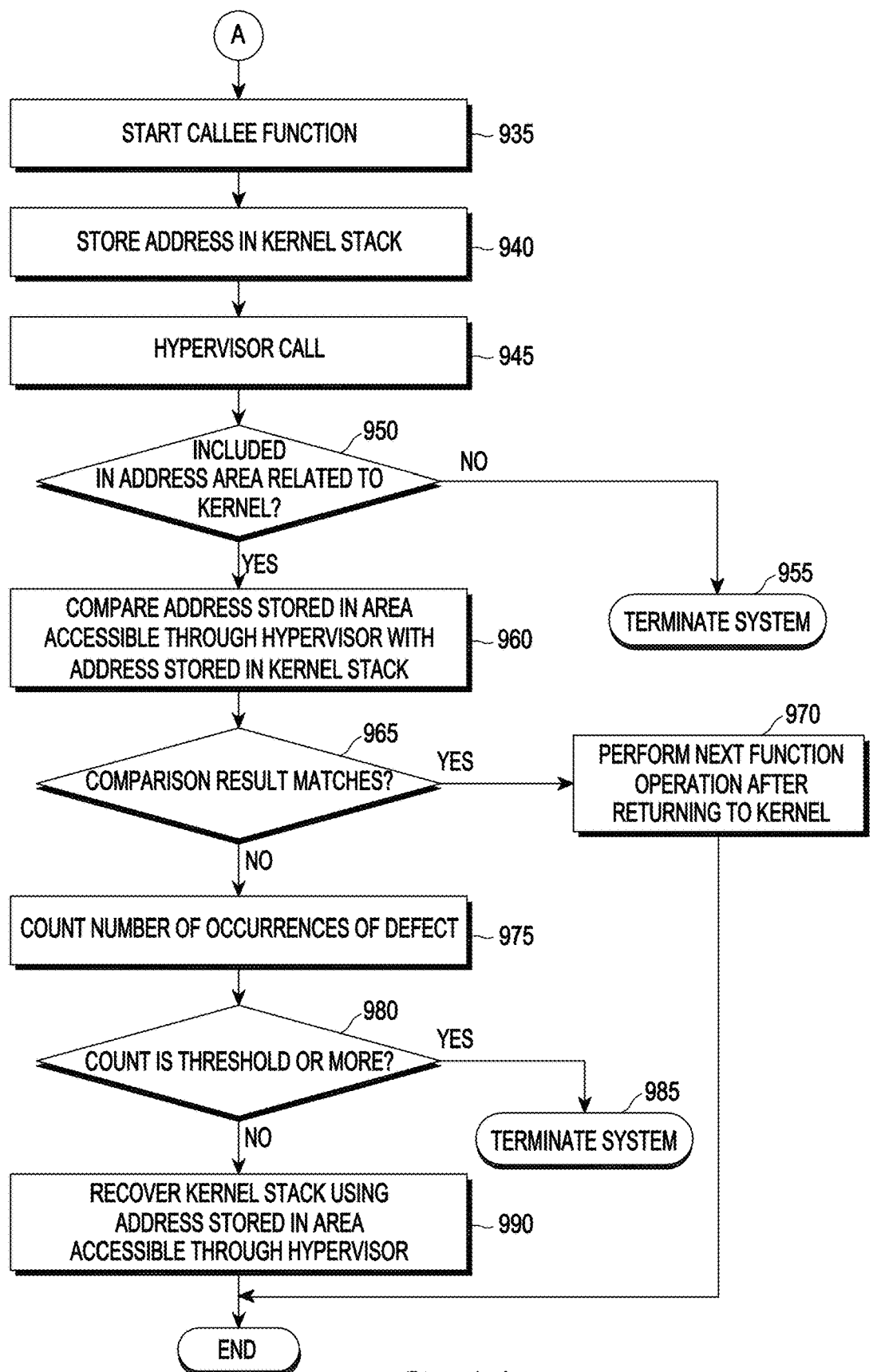
FIG. 10 is a flowchart illustrating example operations continuing from FIG. 9 according to various embodiments.

FIG. 9 is a flowchart illustrating example operations in a hypervisor and a kernel according to various embodiments. FIG. 10 is a flowchart illustrating example operations continuing from FIG. 9 according to various embodiments. Hereinafter, operations in a hypervisor according to a call instruction in a kernel area according to various embodiments are described in greater detail with reference to FIG. 11.

Referring to FIG. 9, in operation 905, the electronic device 601 may start a caller function. Here, the caller function (e.g., function A) may refer, for example, to a function calling another function, and the called function may be referred to as a callee function (e.g., function B). According to an embodiment, the caller function and the callee function may be executed in the supervisor mode of the processor 620.

In operation 910, the electronic device 601 may store return address information before calling the callee function. For example, the electronic device 601 may calculate the address of the instruction to be executed after returning from the address of the currently executed instruction using the size in which the instruction (or command) is stored. Thus, it is possible to calculate the position to return before branching from the caller function to the callee function. Here, the address (or LR value) of the LR may be a register for returning to the memory area corresponding to the process currently being executed for the first memory area accessible through the kernel 520 after the operation in the hypervisor 530 is completed.

The electronic device 601 may perform a hypervisor call in operation 915. For example, the kernel 520 may send a request to the hypervisor 530 using the hypervisor call, which is a call instruction for calling the hypervisor.

Figure 11:
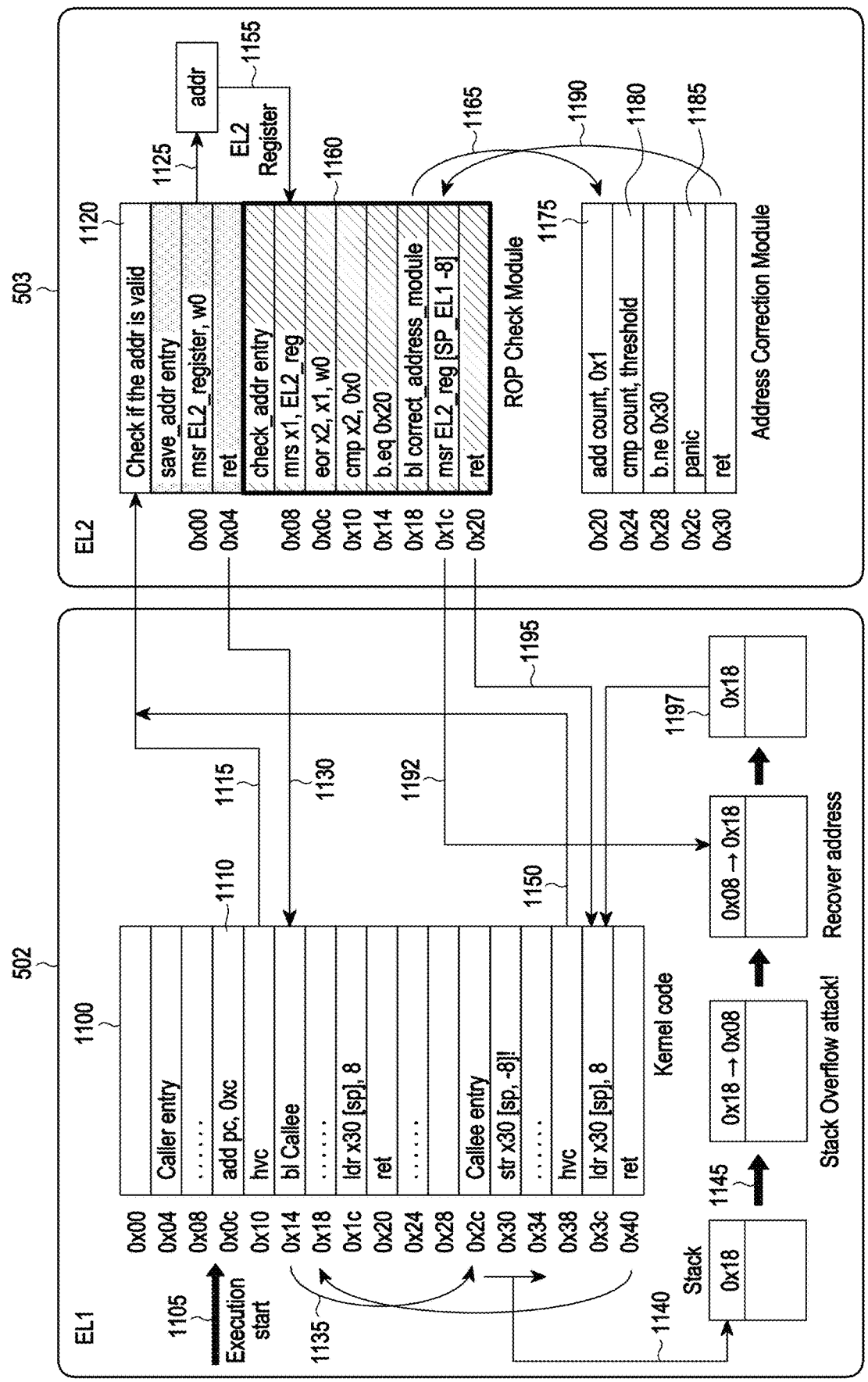
FIG. 11 is a diagram illustrating operations in a hypervisor according to an invocation command in a kernel area according to various embodiments.

For example, as illustrated in FIG. 11, a caller function in the kernel code 1100 may be started in response to an execution request 1105 for the kernel code 1100 in the EL1 502. As the caller function starts, instructions corresponding to the addresses are sequentially executed, and the return address may be calculated at the Ox0c address before calling the callee function at the Ox14 address. For example, the return address may be calculated by the instruction as the instruction stored at the OxOc address is executed. The calculated address to which it is to return before calling the callee function may be transferred to the address defect detector 635 of EL2 503 through the hypervisor call at the next Ox10 address.

Based on the address transferred through the hypervisor call, the electronic device 601 may identify whether the electronic device 601 is included in the address area related to the kernel in operation 920. For example, as illustrated in FIG. 11, the address defect detector 635 of the electronic device 601 may perform authentication 1120 on the address transferred through the hypervisor call 1115.

If the address transferred through the hypervisor call is not included in the address area related to the kernel, the system may be terminated in operation 930 as it is considered as an abnormal address. On the other hand, when the address transferred through the hypervisor call is included in the address area related to the kernel, the electronic device 601 may store the address in an area (e.g., the second memory area) (e.g., the EL2 register 625) accessible through the hypervisor and then return (925) to the kernel 925. Meanwhile, operation 925 of FIG. 9 may be followed by operation 935 of FIG. 10.

For example, as illustrated in FIG. 11, when the authentication 1120 for the address of the kernel transferred through the hypervisor call 1115 is successful, the address defect detector 635 of the electronic device 601 may store (1125) the transferred address in the EL2 register 625, and may return (1130) to the kernel 520 according to the ret instruction of the 0x04 address.

In response to the return 1130, the electronic device 601 operates again in the supervisor mode corresponding to the EL1 502. In response to the branch instruction to the callee function of the 0x14 address, a jump 1135 may be made to the callee function of the 0x2c address.

Referring to FIG. 10, if the callee function is started in operation 935, the electronic device 601 may store the address in the kernel stack in operation 940. Here, the kernel stack may include return addresses for causing the processor to jump to the previous function when the called functions are completed. For example, as illustrated in FIG. 11, if the callee function of the 0x2c address starts, the operation corresponding to the 0x30 address may be the operation of storing 1140 the address Ox18 to be returned to the kernel stack.

As described above, the electronic device 601 may perform a callee function operation, and may send a request to the hypervisor 530 using a hypervisor call, which is a call instruction for calling the hypervisor, in operation 945 before returning to the caller function after the callee function operation. For example, as illustrated in FIG. 11, the address defect detector 635 of the electronic device 601 may perform authentication 1120 on the address transferred through the hypervisor call 1150.

In operation 950, the electronic device 601 may identify whether it is included in the address area related to the kernel, based on the address transferred through the hypervisor call as in operation 920.

If the address transferred through the hypervisor call is not included in the address area related to the kernel, the system may be terminated in operation 955 as it is considered as an abnormal address. On the other hand, when the address stored in the kernel stack transferred through the hypervisor call is included in the address area related to the kernel, the electronic device 601 may compare the address stored in the area accessible through the hypervisor 530 with the transferred address stored in the kernel stack in operation 960.

For example, as illustrated in FIG. 11, when the authentication 1120 for the address transferred through the hypervisor call 1150 is successful, the address defect detector 635 of the electronic device 601 may bring (1155) the transferred address and the address stored in the EL2 register 625 and compare the addresses with each other. Operations 1160 from the Ox08 address to the 0x20 address of FIG. 11 may correspond to the address defect detection operation.

In operation 965, the electronic device 601 may identify whether the comparison results match. According to an embodiment, the comparison operation may be an exclusive OR (XOR) operation.

If the comparison results match, e.g., if the XOR operation result is '0', the next function operation may be performed after returning to the kernel in operation 970. For example, after completing the inspection of the ROP attack based on the comparison result in the hypervisor mode, it may return to the supervisor mode.

On the other hand, when the comparison results do not match, e.g., when the XOR operation result is not '0', the address stored in the kernel stack may be one damaged by manipulation. Accordingly, the electronic device 601 may regard the address in the kernel stack transferred through the hypervisor call as a defective address and may count the number of occurrences of defect in operation 975.

In operation 980, the electronic device 601 may identify whether the number of defect occurrences counted is greater than or equal to a threshold. If the number of defect occurrences counted is greater than or equal to the threshold, the electronic device 601 may terminate the system in operation 985. For example, when a situation in which the number of defect occurrences exceeds the threshold occurs, the system may be terminated to prevent additional memory damage caused by the manipulation attempt by determining that it is a continuous manipulation attempt. On the other hand, when the number of defect occurrences is within the threshold, the address damaged in the kernel stack may be recovered using the address stored in the area (e.g., the EL2 register 625) accessible through the hypervisor 530 in operation 990.

For example, as illustrated in FIG. 11, when the comparison result through the XOR operation is '0', the two addresses are the same. Thus, the kernel 520 may be returned (1195) according to the ret instruction of the Ox20 address. On the other hand, when the comparison result through the XOR operation is not '0', it may be regarded as an address defect and jump (1165) to the Ox20 address corresponding to the address corrector 640. The address corrector 640 may count (1175) the number of defect occurrences at the 0x20 address, and then compare (1180) the counted number of defect occurrences at the 0x24 address with the threshold number. According to an embodiment, the "count" value for counting the number of defect occurrences may be initialized to 0 at the start of the system, and the threshold number may be set to various values according to implementation. As a result of the comparison 1180, when the number of defect occurrences does not reach the threshold number, after returning (1190) to 0x1c corresponding to the operation of the address defect detector 635 according to the ret instruction of the 0x30 address, the damaged address stored in the stack of the kernel 520 may be replaced (1197) with address information stored in the EL2 register 625 to recover the defective address. Accordingly, it may be returned (1195) to the kernel 520 according to the ret instruction of the 0x20 address. As described above, if the address defect detection and recovery operation based on the comparison result in the hypervisor mode is completed, the mode may be switched to the supervisor mode. For example, the address recovery operation may be understood as directly accessing the kernel stack and changing the address because the hypervisor 530 may not only know the address of the kernel stack through the hypervisor call, but also access the return address value stored in the kernel stack. In this case, SP_EL1 may be used to access the kernel stack.

Thereafter, when the address 1197 recovered in the kernel stack in the supervisor mode is put into the LR at the 0x3c address to reach the ret instruction, it may be moved to an undamaged address.

Figure 12:
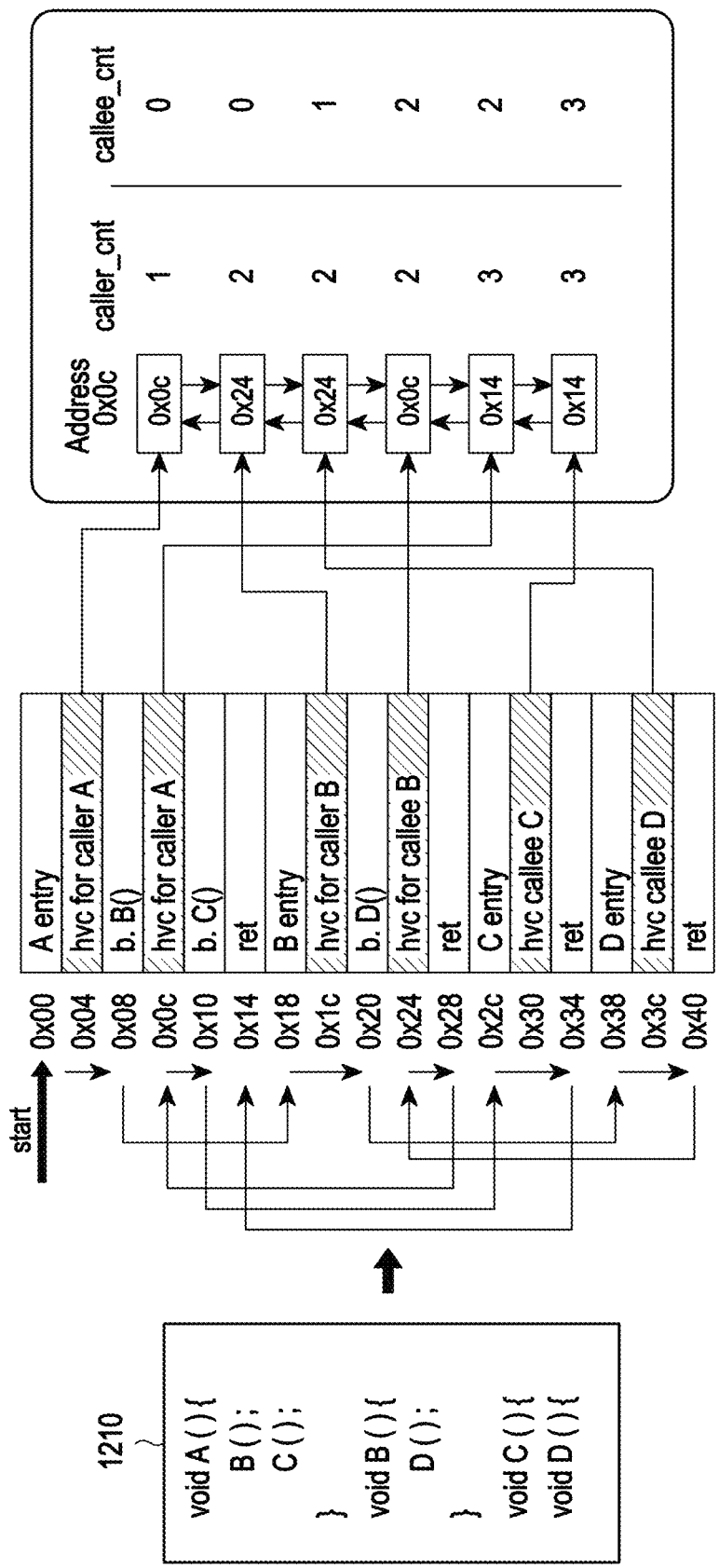
FIG. 12 is a diagram illustrating an asynchronous address defect detection method according to various embodiments.

FIG. 12 is a diagram illustrating an asynchronous address defect detection method according to various embodiments.

Hereinafter, a method for gathering addresses obtained through call instructions in a predetermined unit and collectively identifying whether the addresses are defective, rather than identifying whether the address is defective when the call instruction is received is described with reference to FIG. 12.

FIG. 12 illustrates an example in which the kernel code 1210 includes B function and C function which are callee functions when function A is a caller function, and function D which is a callee function is called when function B is a caller function and is executed.

When each function is executed, an address defect detection operation and a recovery operation may be performed through a hypervisor call for transferring address information to the hypervisor. As shown in FIG. 12, before calling function B, the address may be transferred to the hypervisor through the hypervisor call.

According to an embodiment, the processor 620 operating in the hypervisor mode may manage an address list in which the addresses are collected in a predetermined unit, and may configure variables for identifying whether the addresses are defective, simultaneously in a list unit. For example, the processor 620 operating in the hypervisor mode may manage a threshold value for collecting a predetermined number of operating addresses, the number of times of calling (e.g., caller_count) when the caller function transfers the address through the hypervisor call, and the number of times of being called (e.g., callee_count) when the call function transfers the address through the hypervisor call. Here, it has been described that the operation of identifying the address defect in the list unit is performed by the processor 620, but it may also be performed by the address defect detector 635.

According to an embodiment, when a hypervisor call is received, the processor 620 may store and manage the address transferred through the hypervisor call in the form of a list in a third memory area accessible only through the hypervisor 530, and may identify whether the addresses in the form of the list are defective. Here, the third memory area may be an area, e.g., a DRAM area, allocated in the memory 630. The third memory area is an area that is not accessible through the kernel 520, whereas the third memory area may be an area that is accessible only through the hypervisor 530.

In FIG. 12, when a hypervisor call is received, addresses transferred through each hypervisor call are generated in the order of, e.g., 0x0c, 0x24, 0x24, 0x0c, 0x14, and 0x14, and the number of times of calling (e.g., caller_count) and the number of times of being called (e.g., callee_count) are 3.

Figure 13:
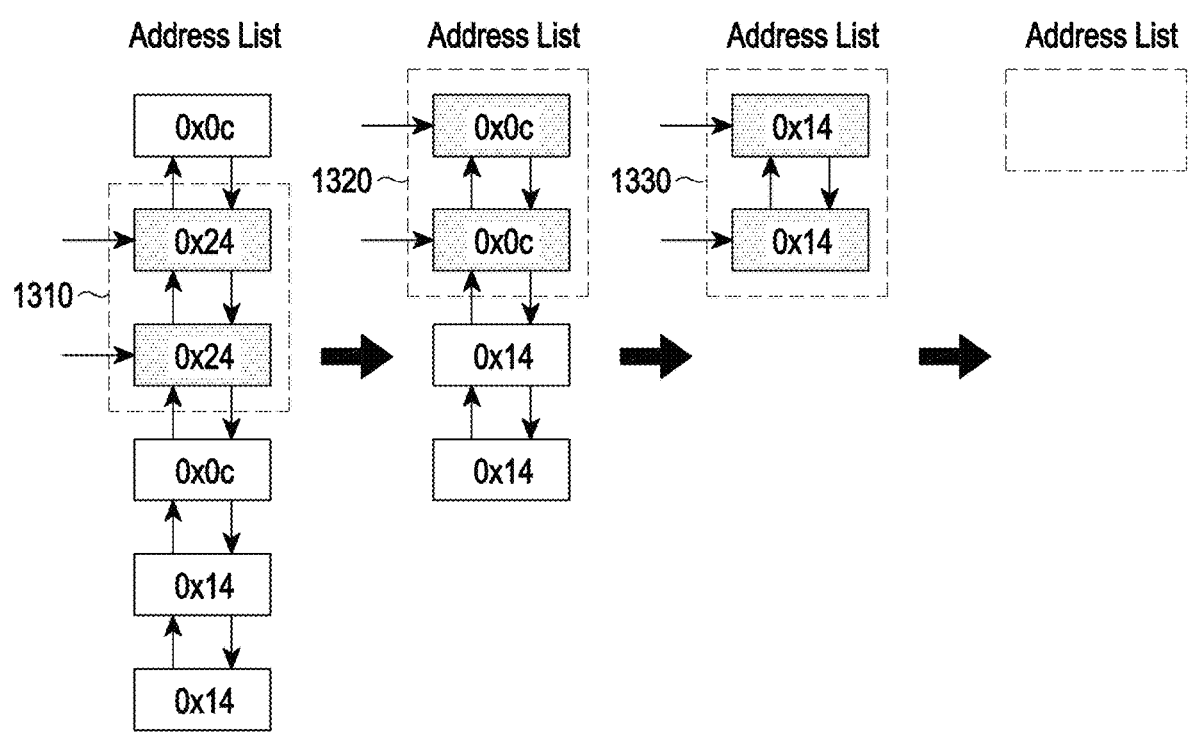
FIGS. 13, 14, and 15 are diagrams illustrating an address defect detection method using an address list according to various embodiments.
Figure 14:
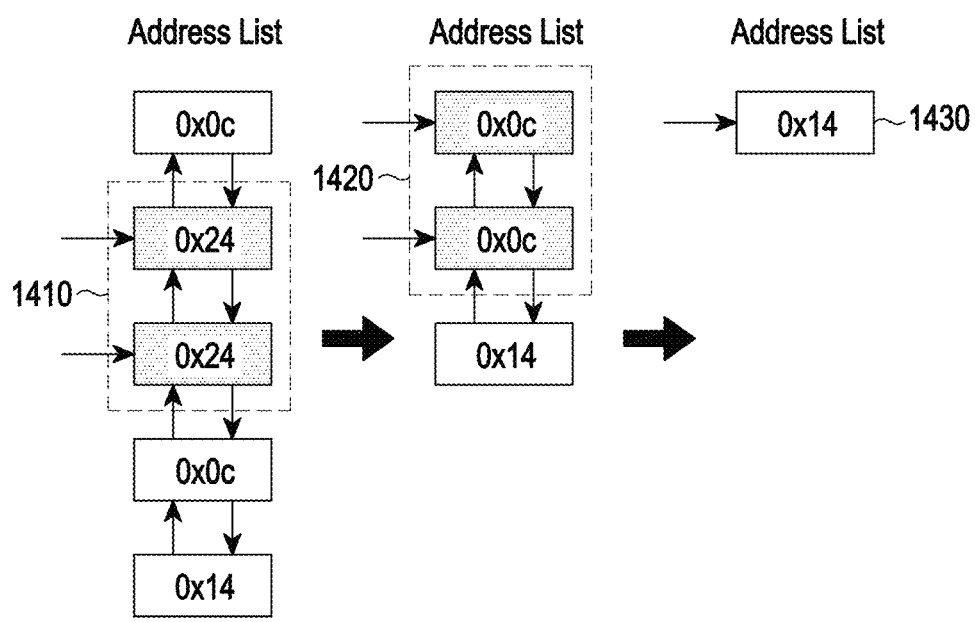
Figure 15:
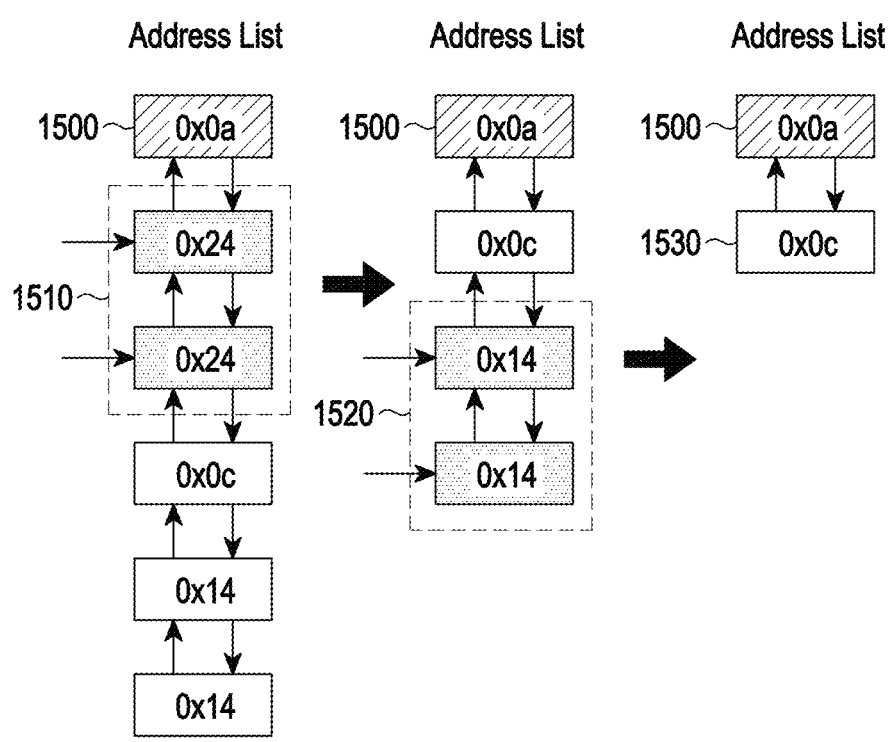

According to various embodiments, after storing address information in the third memory area in the form of a list, it may be at once identified whether the address list is defective when a certain amount of data, e.g., address information included in the list, reaches a certain number. This is described below in detail with reference to FIGS. 13 to 15. FIGS. 13 to 15 are diagrams illustrating an example address defect detection method using an address list according to various embodiments.

As shown in FIG. 13, the processor 620 may delete neighboring addresses 1310 from the address list. For example, if the two adjacent addresses 1310 are the same, e.g., if the two adjacent addresses 1310 have the same address value, the processor 620 may delete the two adjacent addresses 1310 having the same address value from the list. In this way, the two adjacent addresses 1320 remaining in the address list may be compared and deleted if the addresses are the same, and two adjacent addresses 1330 remaining in the list may be compared and deleted. If there is no remaining address in the address list after the above operation is repeated, it may be identified that no defect has occurred.

According to an embodiment, when address information remains in the address list after deleting the two adjacent addresses, if the number of times of calling (e.g., caller_count) minus the number of times of being called (e.g., callee_count) matches the number of remaining addresses, it may be considered that no defect has occurred.

For example, when the number of times of calling (e.g., caller_count) is 3 and the number of times of being called (e.g., callee_count) is 2, the processor 620 may identify whether an address remaining after the neighboring addresses 1410 and 1420 are deleted from the address list is defective, as illustrated in FIG. 14. In FIG. 14, when the number of addresses remaining after subtracting the number of times of being called (e.g., callee_count) 2 from the number of times of calling (e.g., caller_count) 3 is one 1430 and the number of addresses remaining after deleting two adjacent addresses in the address list which are the same are the same, the processor 620 may determine that verification of all addresses in the address list has been completed.

On the other hand, FIG. 15 illustrates an example in which the return address is changed by address manipulation, e.g., 0x0c as the first address in the address list is changed to 0x0a. Referring to FIG. 15, the processor 620 may identify whether there is a defect by comparing the number of times of calling (e.g., caller_count) and the number of times of being called (e.g., callee_count) for the addresses 1500 and 1530 remaining in the list after deleting neighboring addresses 1510 and 1520 in the address list.

For example, when the number of times of calling (e.g., caller_count) and the number of times of being called (e.g., callee_count) are 3, respectively, the number of addresses remaining after subtracting the number of times of being called (e.g., callee_count) 3 from the number of times of calling (e.g., caller_count) 3 should be 0. However, as illustrated in FIG. 15, when two non-deleted addresses are left in the list, it may be determined that the address has been manipulated. Accordingly, the processor 620 may terminate the system to prevent additional memory damage due to an address manipulation attempt. For example, the processor 620 may reset the system. According to various embodiments, performance enhancement may be expected by at once processing identification of whether an address defect occurs when a predetermined amount of data is gathered.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

According to various example embodiments, a non-volatile storage medium storing instructions, wherein the instructions are configured to, when executed by at least one processor of an electronic device, cause the electronic device to perform at least one operation, the at least one operation comprising obtaining, from a kernel, at least one address for a first memory area accessible through the kernel, storing the at least one address in a second memory area accessible through a hypervisor, based on obtaining an address stored in a kernel stack from the kernel, identifying whether the obtained address is defective based on the stored at least one address, and recovering the defective address using at least one address stored in the second memory area in response to identifying the defect in the obtained address

What is claimed is:

1. An electronic device, comprising:
   at least one processor; and
   memory operatively connected with the at least one processor, wherein the memory stores instructions which, when executed by the at least one processor, cause the electronic device to:
   obtain, from a kernel, at least one address for a first memory area accessible through the kernel;
   store the at least one address in a second memory area accessible through a hypervisor;
   based on obtaining an address stored in a kernel stack from the kernel, identify whether the obtained address is defective based on the stored at least one address; and
   recover the defective address using at least one address stored in the second memory area in response to identifying the defect in the address.

2. The electronic device of claim 1, wherein the instructions, when executed, cause the electronic device to obtain the at least one address through an invocation instruction for transferring the at least one address for the first memory area to the hypervisor from the kernel.

3. The electronic device of claim 1, wherein the instructions, when executed, cause the electronic device to:
   identify whether the at least one address is included in an address area related to the kernel in response to obtaining the at least one address; and
   based on the at least one address being included in the address area related to the kernel, store the at least one address in the second memory area.

4. The electronic device of claim 1, wherein the instructions, when executed, cause the electronic device to:
   identify whether the obtained address is included in an address area related to the kernel through an invocation instruction for transferring the address to the hypervisor from the kernel; and
   based on the obtained address being included in the address area related to the kernel, identify whether the obtained address is defective based on the stored at least one address.

5. The electronic device of claim 4, wherein the instructions, when executed, cause the electronic device to, based on an address stored in the kernel stack being obtained through the invocation instruction, identify whether the obtained address is defective.

6. The electronic device of claim 4, wherein the instructions, when executed, cause the electronic device to:
   based on an address stored in the kernel stack being obtained through the invocation instruction, store the obtained address in a third memory area accessible through the hypervisor; and
   manage the address stored in the third memory area in a specified number of lists and identify whether the address list is defective.

7. The electronic device of claim 6, wherein the instructions, when executed, cause the electronic device to, based on comparing neighboring addresses in the address list, based on the neighboring addresses being the same, delete the neighboring addresses, and identify whether remaining addresses after the deletion are defective.

8. The electronic device of claim 6, wherein each of the second memory area and the third memory area include an area accessible through the hypervisor but inaccessible through the kernel.

9. The electronic device of claim 4, wherein the instructions, when executed, cause the electronic device to, compare the stored at least one address with the obtained address and, based on a result of the comparison not matching, identify that the obtained address is defective.

10. The electronic device of claim 9, wherein the instructions, when executed, cause the electronic device to:
    count a number of times in which the result of the comparison does not match; and
    based on the count being a specified threshold or more, recover the defective address using at least one address stored in the second memory area.

11. A memory management method for security in an electronic device, comprising:
    obtaining, from a kernel, at least one address for a first memory area accessible through the kernel;
    storing the at least one address in a second memory area accessible through a hypervisor;
    based on obtaining an address stored in a kernel stack from the kernel, identifying whether the obtained address is defective based on the stored at least one address; and
    recovering the defective address using at least one address stored in the second memory area in response to identifying the defect in the obtained address.

12. The method of claim 11, wherein obtaining the at least one address for the first memory area includes obtaining the at least one address through an invocation instruction for transferring the at least one address for the first memory area to the hypervisor from the kernel.

13. The method of claim 11, wherein storing the at least one address in the second memory area includes:
    identifying whether the at least one address is included in an address area related to the kernel in response to obtaining the at least one address; and
    based on the at least one address being included in the address area related to the kernel, storing the at least one address in the second memory area.

14. The method of claim 11, wherein identifying whether the obtained address has the defect includes:
    obtaining an address stored in the kernel stack through an invocation instruction for transferring the address to the hypervisor from the kernel;
    identifying whether the obtained address is included in an address area related to the kernel; and
    based on the obtained address information being included in the address area related to the kernel, identifying whether the obtained address is defective based on the stored at least one address.

15. The method of claim 14, further comprising:
    based on an address stored in the kernel stack being obtained through the invocation instruction, storing the obtained address in a third memory area accessible through the hypervisor; and
    managing the address stored in the third memory area in a specified number of lists and identifying whether the address list is defective.

16. A non-volatile storage medium storing instructions, wherein the instructions are configured to, when executed by at least one processor of an electronic device, cause the electronic device to perform at least one operation, the at least one operation comprising:
    obtaining, from a kernel, at least one address for a first memory area accessible through the kernel;
    storing the at least one address in a second memory area accessible through a hypervisor;

based on obtaining an address stored in a kernel stack from the kernel, identifying whether the obtained address is defective based on the stored at least one address; and recovering the defective address using at least one address stored in the second memory area in response to identifying the defect in the obtained address.

\* \* \* \* \*